June 25, 1968
L. MOSKOWITZ
3,389,608
ACCELEROMETER
Filed Aug. 10, 1964
2 Sheets-Sheet 1
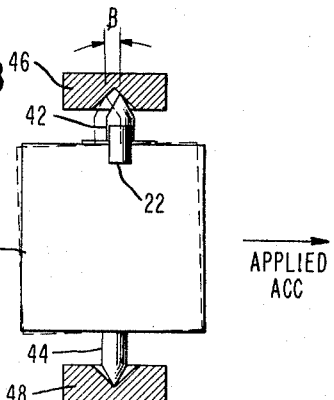
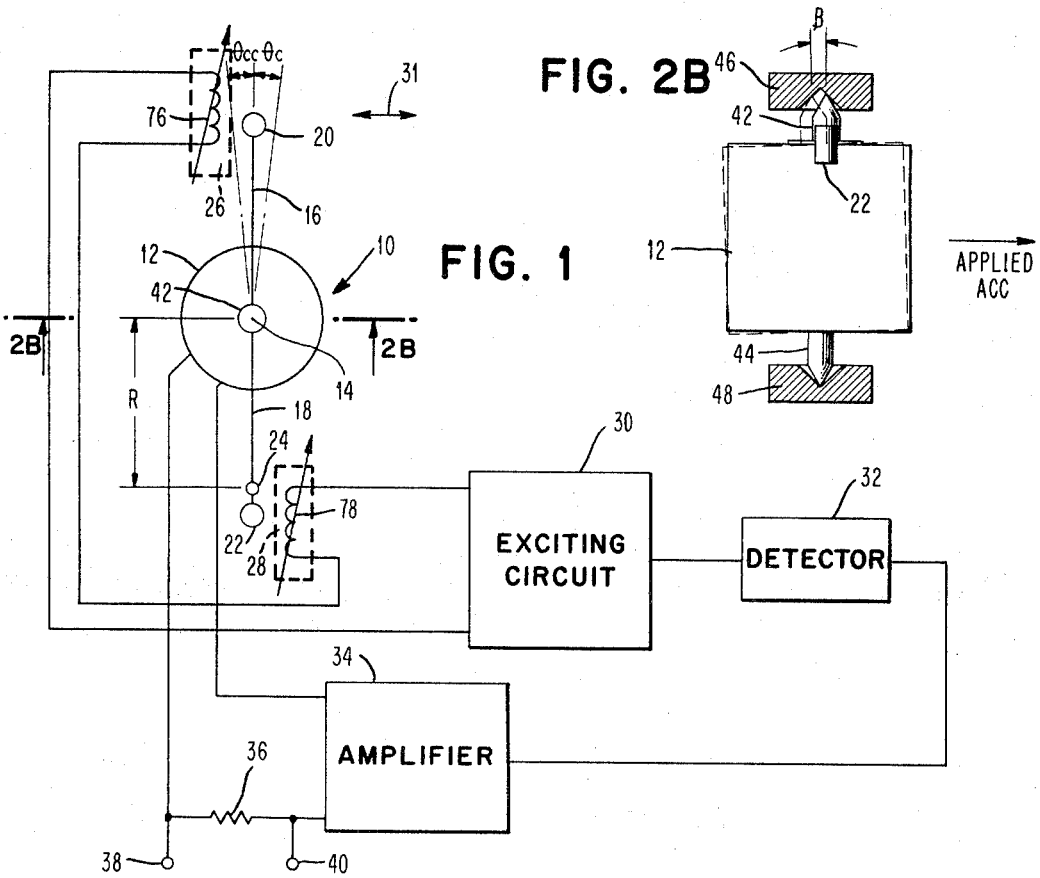
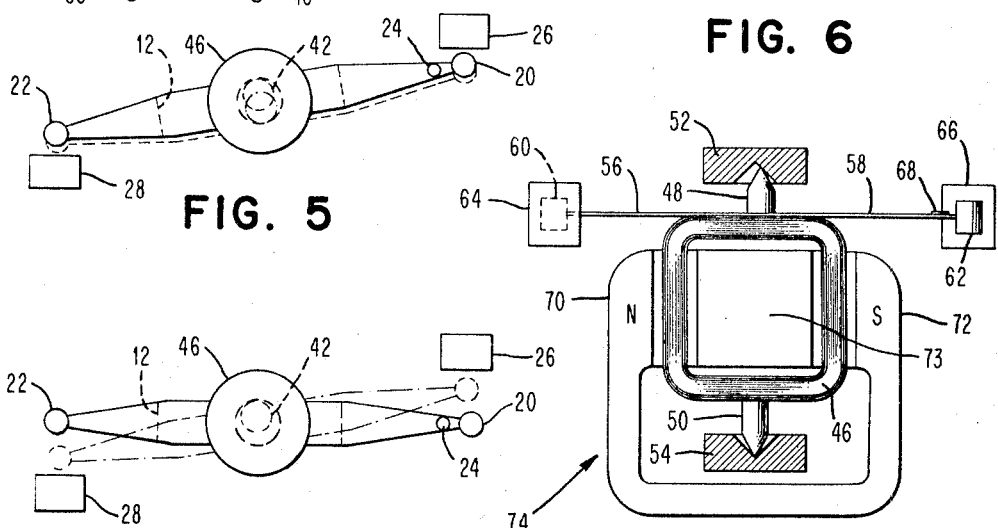
INVENTOR
LAWRENCE MOSKOWITZ
BY
*Edward M. Farrell*
ATTORNEY June 25, 1968 L. MOSKOWITZ 3,389,608
ACCELEROMETER
Filed Aug. 10, 1964 2 Sheets-Sheet 2
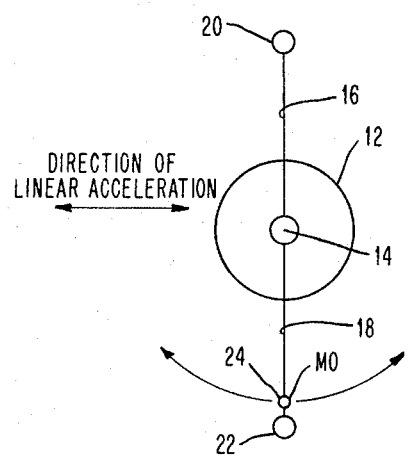
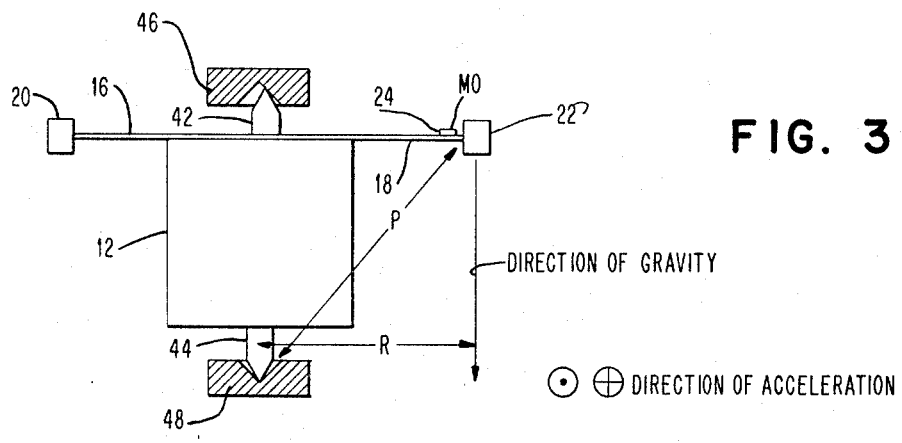

United States Patent Office 3,389,608
Patented June 25, 1968

3,389,608
ACCELEROMETER
Lawrence Moskowitz, Camden, N.J., assignor to Schaevitz Engineering, a corporation of New Jersey
Filed Aug. 10, 1964, Ser. No. 388,451
7 Claims. (Cl. 73—517)

This invention relates to transducer and, more particularly, to transducers for measuring linear acceleration of a moving body.

Force balance servo linear accelerometers have assumed various different forms in the past. One such form involves the use of a mechanical arrangement including the use of a D'Arsonval type meter movement. In this arrangement, a moving coil is intentionally unbalanced about its pivot axis by adding a mass or weight. The unbalanced mass is responsive to linear acceleration. When the mass is acted upon by linear acceleration, a torque is developed about the pivot axis of the coil which tends to rotate it. An opposed or balance torque may be developed by electric current through the coil. This balance torque or current is derived by sensing the displacement that would be caused by the applied acceleration and, after suitable amplification, applying the resultant to the coil to complete the servo loop.

In order for the accelerometer mentioned to operate efficiently, it is important that the friction force developed in the coil carrying bearings be very small compared to the force developed in the unbalance mass. In many devices used heretofore, conically shaped pointed pivots and conically recessed jewels have been used. In general, such arrangements are capable of maintaining relatively low friction provided that sufficient end clearance is provided between the pivots and the recessed jewels. Accomplishing this low friction prior to the present invention has been a problem. If insufficient end clearance is allowed, there is the possibility of expansions of the elements in the direction of the pivot axis due to temperature or other reasons. This results in end to end pivot bearing contact and, therefore, high friction.

Generally in devices of the type described, the geometry of the parts is such that large lateral clearances are associated with small end clearances. For example in one case of typical pivots and jewels, an axial clearance of .00025" results in lateral clearance of .002". Experience has shown that dimensions in the order of .00025" are too small for end clearances. The reasons for this include the difficulty involved in adjustment and the interference which may result from temperature differentials.

It is an object of this invention to provide an improved accelerometer.

It is a further object of this invention to provide an improved accelerometer of high sensitivity.

It is still a further object of this invention to provide an improved accelerometer of high sensitivity under widely varying temperature conditions.

It is still a further object of this invention to provide an improved accelerometer involving a D'Arsonval type meter movement wherein the friction of the bearing elements is minimized.

It is still a further object of this invention to provide an improved accelerometer for measuring linear acceleration.

In accordance with the present invention, an accelerometer is provided. A torque producing element is mounted to a pair of pivot elements with the pivot elements being disposed within bearing elements to permit rotation of the torque producing element. A pair of sensing elements are provided for developing signals proportional to the degree of rotation of the torque producing element. The pair of sensing elements are connected in series to produce an additive combined signal. A weight or mass is associated with one of the sensing elements to cause rotation of the torque producing element when it is moved in a linear direction. A correspondance is indicated between a linear movement and a rotary movement. Any element on the rotating part may be considered as moving linearly for very small angles of rotation.

Other objects and advantages of the present invention will be apparent and suggest themselves to those skilled in the art, from a reading of the following specification and claims, in conjunction with the accompanying drawing, in which:

FIGURE 1 is a block diagram of a system illustrating the present invention;

FIGURES 2A and 2B are plan and elevation views illustrating some of the features of a torque producing device of FIGURE 1 including its mounting arrangement;

FIGURE 3 is a side view of FIGURE 2B.

FIGURE 4 illustrates a torque producing device, in accordance with the present invention, for one condition of operation;

FIGURE 5 illustrates the same torque measuring device of FIGURE 4 during a second condition of operation, and FIGURE 6 illustrates a linear accelerometer utilizing a D'Arsonval type meter movement, in accordance with the present invention.

Referring particularly to FIGURE 1, an accelerometer 10 includes a device 12 which is adapted to be rotated about an axis 14. A pair of arm elements 16 and 18 are provided with a pair of coupling end elements 20 and 22, respectively, and are adapted to be rotated through $<\theta_c$ or $<\theta_{cc}$, indicating clockwise or counterclockwise angular movement, respectively. A mass or weight 24 is suitably attached to the arm 18.

The end elements 20 and 22 are electromagnetically coupled to sensing elements illustrated as being coils 26 and 28. The coils 26 and 28 are connected to an exciting circuit 30 and may be part of the oscillator tank circuit thereof. The exciting circuit 30 may be designed to operate at a certain frequency to produce an output signal of a certain amplitude. The output signal from the exciting circuit 30 is affected by the distances between the end elements 20 and 22 with respect to their associated sensing elements or coils 26 and 28, respectively. The end elements 20 and 22 may provide a variable shielding effect to produce variations in the amplitude of the exciting circuit, dependent upon the distances between the end elements and the sensing elements.

The accelerometer 10 is designed to respond to variations in acceleration in the directions indicated by the arrows 31. Accelerations acting on the mass 24 produces a force in accordance with the fundamental equation Force=mass×acceleration. This force multiplied by the radius R constitutes a torque which will tend to rotate the arm 18 and consequently the torque producing element device 12, and consequently also the arm 16. When the accelerometer 10 is subjected to acceleration towards the left, for example, the device 12 will tend to rotate about the axis 14 in a counterclockwise direction. If the acceleration is towards the right, the device 12 will be rotated in a clockwise direction.

As the device 12 is rotated in a counterclockwise direction, the end elements 20 and 22 both come closer to the sensing elements 26 and 28. The sensing elements, being connected in series, provide an additive effect, with both the end elements providing equal effects upon the sensing elements.

Likewise, as the end elements 20 and 22 are moved clockwise, their effects upon their respective sensing elements become less. Again, the effects are additive, as both end elements are simultaneously moved away from their respective sensing elements.

The output signal from the exciting circuit 30 is applied to a detector circuit 32 which, after suitable rectification and filtering, produces an electrical signal which corresponds to the changes in amplitude of the signal produced in the exciting circuit 30, which, as previously mentioned, may be the tank circuit of an oscillator. As mentioned, the variations in the signal corresponds to the degree of rotation (i.e. $<\theta_c$ or $<\theta_{cc}$) of the device 12 and its attached end elements 20 and 22.

The output signal from the detector 32 is applied to an amplifier 34. After suitable amplification, the output signal in the form of a current from the amplifier 34 is applied through a resistor 36, through the torque producing element device 12, and then back to the amplifier 34. The current through device 12 will produce a torque equal and opposite to the torque produced by the applied acceleration and so the system will come to a condition of equilibrium.

The voltage developed across the resistor 36 may be applied from output terminals 38 and 40 to suitable measuring or other utilization circuits to measure the applied acceleration. This output signal of course represents the torque produced within the device 12 by the acceleration thereof.

The signal from the amplifier 34 may be considered as a balance restoring current which is applied to the device 12 to restore it to its original position before acceleration thereof. In other words, the electrical signal from the amplifier 34 is used to restore the device to its original position.

The device 12 may assume various different forms capable of developing a torque from rotary movement and being restored to its original position by an electrical signal. It could be various types of motors, solenoids or other types of devices. In one particular embodiment to be subsequently described, the device 12 is a coil mounted in a magnetic field.

Referring to FIGURE 2B, the device 12 is illustrated as being mounted to a pair of conically shaped end pivots 42 and 44. The pivots 42 and 44 are disposed within a pair of conically recessed bearings 46 and 48, respectively. It may be seen that the pivots 42 and 44 are loosely fitted into the recessed bearings 46 and 48. In this case, it may be said that the end clearance between the pivots and the bearings is relatively large. This is a desirable feature since the degree of friction between the pivots and the bearings is minimized. In addition, the relatively large end clearances make it possible to make some allowances for changes in the dimensions of the pivots or bearings. Such changes in dimensions may result from temperature changes, for example.

It may be seen that if the dimensions of the pivots or bearings expand, the end clearances would be reduced. This could be accompanied by relatively high friction if the clearance were reduced sufficiently to bring the conical pivot tips into intimate contact with the conical bearing apexes.

When at rest, the lower pivot will essentially be seated fully in its conically recessed bearing. The upper pivot will be resting on the conical side of its bearing recess, generally on the conical element which would be the intersection of the cone with a plane passing through the pivot axis and the unbalanced mass (as shown in FIGURE 3).

Before discussing the invention further, let us see what would happen if there were no unbalanced mass.

If there were no unbalanced mass, there would not be any rotation about the pivot axis due to a moment of force on the unbalanced mass multiplied by the length of an arm between the unbalanced mass and the pivot axis. If the mass were $M_0$ and the acceleration $A_0$ the force would be $F_0 = M_0 \times A_0$ and the moment would be $F_0 \times R$. Thus if there is no unbalanced $M_0$, there would be no $F_0$, and no rotating moment.

Before applying the acceleration, the position of the upper pivot would be indefinite. If absolutely perfectly balanced and if the pivot axis were perfectly vertical the upper pivot would remain in any position (somewhere contacting the conical bearing surface) it were placed. If linear acceleration were applied it would move to contact the element of the bearing cone cut by a plane through the pivot axis and parallel to the direction of acceleration. In so moving it would carry both sensors with it equally and if the sensors were of equal sensitivity and connected so the outputs opposed there would be no output. Since, without an unbalance mass the system does not constitute a linear accelerometer, it is proper that there should be no output due to linear acceleration. However, if there were not a balanced sensor system the resultant translation acting on a single sensor would result in an output. The acceleration is acting on the center of mass which in the case described, if perfect symmetry existed, would be the center of the coil opening.

Now let us see how different the action is when there is an unbalanced mass. First let us realize that the center of mass of the system is no longer the center of the coil or torque responsive element. The applied acceleration will then have two kinds of action. Firstly it will act on the new center of mass to move the combined system linearly. But the system is not free to move linearly in line with the applied acceleration because it would have to move perpendicularly. But it cannot do this because the curved conical surface of the upper bearing would force it to the left. At the same time acceleration acting on $M_0$ would cause it to rotate. But here again there are restraints. There is a moment arm from the axis of the pivots to the unbalanced mass, and the moment would cause the desired rotation about the pivot axis. There is however, also a moment arm between the mass $M_0$ and the lower pivot and then would tend to cause a rotation about the lower pivot. The net result of all of these actions is an equivalent desired rotation about the pivot axis and an equivalent undesired translation of the entire system in the direction of the applied acceleration. This equivalent translation has been caused by the bearing clearance and the electrical resultant of this translation is an undesired accelerometer output not corresponding to the acceleration input to the accelerometer. The purpose of this invention is to eliminate the undesired electrical resultant of the desired bearing clearance. The equivalent translation cannot usually translate both sensors equally. Consequently if the sensors are of equal sensitivity and connected so the outputs oppose there will still be a resultant output, due to translation. This can be caused to be a zero output by proportioning each sensor sensitivity inversely to the resultant translation of the respective sensors.

In order for the arrangement thus far mentioned to constitute a successful accelerometer, consideration must be given to another mode of operation which occurs when a larger applied acceleration acting directly on the center of mass of the torque producing element 12 the arms 16 and 18, the ends 20 and 22, and the unbalanced mass 24 causes it to rotate about the lower pivot beyond a certain angle which is sufficient to cause the entire system to move to the position shown in the dotted outline of FIGURE 2B. The upper pivot may be said to be moved through $<\beta$. It is apparent that any signals produced by the shifting of the center of mass of the system or sudden movement of the pivots within their bearings do not actually represent the desired rotary torque produced by acceleration acting on mass 24. Such signals may be considered as transient or spurious signals. To obtain accurate measurements relating to acceleration or rotary movement, it is desirable to eliminate these spurious signals. The present invention accomplishes this relatively simply and inexpensively and without the use of complicated circuitry.

Consider a typical operating case utilizing the arrangement illustrated in FIGURE 2B. The vertical axis and gravity causes the lower pivot 44 to rest in the recess bearing 48. For relatively low rates of acceleration, the unbalanced mass 24 (FIGURE 3) will cause rotation of the lower pivot 44 within the bottom portion of the bearing 48. The upper pivot 42, with low rates of acceleration, will roll on the upper bearing 46.

As the level of acceleration is increased, in addition to the rotation of the pivot 44 about its lower bearing 48, the force developed on the mass of the device 12 will cause the upper pivot 42 to "toggle" through the angle $\beta$ (FIGURE 2B) to the other side within the bearing 46. This results in a spurious signal not representative of the rate of acceleration.

Referring again to FIGURE 1, it was seen that the signals produced within the sensors 26 and 28 were additive as the device 12 was rotated through angles $\theta_c$ or $\theta_{cc}$. This was because both the end elements 20 and 22 simultaneously approached or receded from their respective sensing devices. However, if a toggling action, such as described, takes place, the end element 20 will approach the sensing element 26 as the end element 22 moves away from the sensing element 28, or vice versa, dependent upon the direction of the toggling or abrupt bouncing movement of the upper pivot.

It may be seen that if the end element 20 moves closer to its sensing element 26 and the end element 22 moves away from the sensing element 28 that equal and opposite signals will be induced in the sensing elements. The opposite signals, being connected in an additive relationship, effectively cancel each other. Therefore, the spurious signals resulting from a toggling action of the pivots carrying the device 12 will be cancelled.

The basic operations thus far described are more clearly illustrated by a reference to FIGURES 4 and 5. FIGURE 4 illustrates a condition of operation for relatively low rates of acceleration. The solid lines illustrate the positions of the end elements 22 and 24 in a neutral position prior to any acceleration. During operation, the device 12 may be moved either clockwise or counterclockwise, dependent upon the direction of the acceleration. The embodiment illustrated, the end elements 20 and 22 are moved in a counterclockwise direction, as indicated by the dotted lines. The elements 20 and 22 are moved closer to the sensing elements 26 and 28, respectively, to produce an additive combined voltage as previously described.

In FIGURE 5 there is illustrated a condition in which the device 12 is rotated beyond a point so as to cause a toggling of the upper pivot, as described in connection with FIGURE 2B. The dotted lines represent the condition of operation prior to toggling and the solid lines represent the condition of operation after the toggling. It may be seen that after the toggling, that the end element 20 moves closer to the sensing element 26 while the end element 22 moves away from the sensing element 28.

Referring particularly to FIGURE 6, a specific embodiment of the present invention includes a coil 46 mounted on pivots 48 and 50 which are disposed to be rotated within the recessed bearings 52 and 54, respectively, in a manner similar to that described in connection with previous FIGURES 1 to 5.

The coil 46 carries a pair of arms 56 and 58 having end elements 60 and 62 adapted to be moved with respect to the sensing elements 64 and 66, repectively. A weight or mass 68 is provided on the arm 58.

The coil 46 is disposed within a magnetic field produced between the pole pieces 70 and 72 of the magnet 74. The magnetic path extends through the pole pieces through a suitable magnetic element 73 disposed between the coil. This element 73 may form part of the overall magnetic structure.

In the presence of acceleration forces, the coil 46 is rotated either clockwise or counterclockwise dependent upon the direction of acceleration. Restoring or balancing current is applied to the coil 46 to force it back to its neutral position. The amount of current required to restore the coil 46 is indicative of the degree of acceleration.

In the invention as described it was seen that the mass of weight was on one of the arms only. Consequently, the location of the system center of mass is not symmetrically positioned with respect to the sensors. The arms or end elements will therefore not be moved equally because of the difference in the center of mass from the center point of the physical structure. Consequently, a given displacement of the system's center of mass due to an undesired translation, will not normally result in equal displacements of the end elements with respect to their associated sensing elements. Therefore, while as shown in FIGURE 5 there will be a compensatory action, it will not be equal and opposite at the two sensing points. Therefore, the sensitivities of the individual sensors must be adjusted to achieve the proper operation.

In FIGURE 1, for example, a pair of arrows 76 and 78 are illustrated as being associated with the sensing elements 26 and 28, respectively. These arrows indicate that the sensitivities of the sensors may be adjusted by various suitable means. Some such means may include varying the number of turns in an inductive coil, adding resistances or other suitable circuitry to obtain the proper levels of sensitivities.

If the motion of a first element, for example, with respect to its associated first sensor is twice that of the other second end element with respect to its associated second sensor, the first sensor should then have one half the sensitivity of the second sensor.

If a change in sensor output is designated "$\Delta s$" and a change in displacement is designated "$\Delta d$," then sensitivity is defined as $\Delta s/\Delta d$. Then the first sensor should have a sensitivity of $$\frac{K}{2}\frac{\Delta s}{\Delta d}$$

and the second sensor should have a sensitivity of $$K\frac{\Delta s}{\Delta d}$$

A $2\Delta d$ displacement of the first sensor will cause a sensor output of $$2\Delta d \times \frac{K}{2}\frac{\Delta s}{\Delta d}=K\Delta s$$

A $\Delta d$ displacement of the second sensor is actually $-\Delta d$ displacement since its direction is relatively opposite to the first sensor. A $-\Delta d$ displacement of the second sensor will cause a sensor output of $$-\Delta d K\frac{\Delta s}{\Delta d}=-K\Delta s$$

The two output signals from the sensors cancel each other when they are summed. Alternately, the second sensor could be arranged for the sensor outputs to substract rather than add and thus require the same relative displacement for cancellation.

In the example given, if the radial locations of the two end elements are equal, the output signal at the second sensor caused by a rotaty displacement of $\Delta d$ would be:

$$\Delta d\frac{K\Delta s}{\Delta d}=K\Delta s$$

An equal and similarly directed displacement would occur at the first sensor with a resultant output of:

$$\Delta d\frac{K}{2}\frac{\Delta s}{\Delta d}=\frac{K}{2}\Delta s$$

Since these would be additive the total would be $\tfrac{3}{2}K\Delta s$ illustrating the fact that although unequal sensitivities are required for cancellation of unequal translations the net result for the desired rotational motions is always additive.

Of course, it should be realized that the relative sensitivities of the two sensors may be of various different ratios as well as those ratios discussed.

It has been seen that the present invention has provided a novel accelerometer of high sensitivity, which may be easily adjusted and in which temperature effects during operation are minimized.

The present invention may take numerous other forms in addition to those illustrated. Various detailed circuitry normally associated with accelerometers of the types described have not been illustrated in detail since such circuitry is well known to those skilled in the art and is only indirectly related to the present invention.

What is claimed is:

1. An accelerometer comprising a coil, a pair of bearing elements, a pair of pivot elements connected to said coil and disposed within said bearing elements to permit rotation of said coil, the end clearance between said bearing and pivot elements being relatively large, a pair of sensing elements for producing electrical signals to detect the degree of rotation of said coil, a pair of coupling elements disposed to be moved relative to respective sensing elements as said coil is rotated or displaced to vary the electrical signals in said sensing elements, a weight associated with one of said coupling elements to cause rotation of said coil and said coupling elements when said accelerometer is accelerated in a linear direction, said end clearance being such that said weight causes said coil to shift to a second position when the linear acceleration exceeds a certain point causing one of said coupling elements to be moved away from its associated sensing element and the other coupling element to be moved towards its associated coupling element.

2. An accelerometer comprising a coil, a pair of bearing elements, a pair of pivot elements connected to said coil and disposed within said bearing elements to permit rotation of said coil, a circuit including a pair of sensing elements for producing electrical signals to detect the degree of rotation of said coil, said pair of sensing elements being connected to produce an additive combined signal, a pair of coupling elements disposed to be moved relative to respective sensing elements as said coil is rotated to vary the electrical signals in said sensing elements, a weight associated with one of said coupling elements to cause rotation of said coil and said coupling elements when said accelerometer is accelerated in a linear direction, the relative spacing between said pivots and said bearings being such that the weight associated with said one coupling element causes said coil to abruptly shift to a second position when the linear movement of said coil exceeds a certain point thereby causing one of said coupling elements to be moved away from its associated sensing elements and the other coupling element to be moved towards its associated coupling element.

3. An accelerometer comprising a coil, a pair of bearing elements having conically shaped recesses, a pair of conically shaped pivot elements connected to said coil and disposed within said bearing elements to permit rotation of said coil, the relative dimensions of said bearing elements and said pivot elements being such so as to provide a relatively large end clearance, a circuit including a pair of sensing elements connected to each other in series relationship for producing additive combined electrical signals to detect the degree of rotation of said coil, a pair of coupling elements connected to said coil and disposed to be moved relative to respective sensing elements as said coil is rotated in response to acceleration to vary the electrical signals in said sensing elements, a weight associated with one of said coupling elements to cause rotation of said coil and said coupling elements when said accelerometer is accelerated in a linear direction, the end clearance between said pivots and said bearings being such that a shift in the center of mass resulting from said weight causes said coil to shift to a second position thereby causing one of said coupling elements to be moved away from its associated sensing element and the other coupling elements to be moved towards its associated coupling element whereby cancelling signals are produced in said sensors making said accelerometer nonresponsive to changes in signals produced by changes in the center of mass of said accelerometer.

4. The invention as set forth in claim 3 wherein the output signals from said sensing elements are used to provide restoring forces to said coil.

5. The invention as set forth in claim 3 wherein said sensing elements form part of an oscillator circuit.

6. The invention as set forth in claim 4 wherein said coil is adapted to be moved in a magnetic field.

7. The invention as set forth in claim 5 wherein variations in the output signal from said oscillator caused by the signals from said sensing elements are used to provide restoring forces to said coil.

References Cited

UNITED STATES PATENTS

| | | | |
|---|---|---|---|
| 2,498,118 | 2/1950 | Weiss | 73—516 |
| 2,878,006 | 3/1950 | Sedgfield et al. | 73—50 X |
| 2,899,190 | 8/1959 | Driver | 73—517 |
| 2,978,910 | 4/1961 | Aske | 73—515 |
| 2,995,038 | 8/1961 | Singleton et al. | 73—516 |
| 3,018,142 | 1/1962 | Warnock | 73—496 X |
| 3,074,279 | 1/1963 | Morris | 73—517 |
| 3,078,721 | 2/1963 | Sawyer | 73—516 X |

JAMES J. GILL, *Primary Examiner.*

RICHARD C. QUEISSER, *Examiner.*